(12) United States Patent
Xie et al.

(10) Patent No.: US 9,515,328 B2
(45) Date of Patent: Dec. 6, 2016

(54) DIFFUSION MEDIA, FUEL CELLS, AND FUEL CELL POWERED SYSTEMS

(75) Inventors: Tao Xie, Troy, MI (US); Chunxin Ji, Rochester, NY (US); Yang-Tse Cheng, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1029 days.

(21) Appl. No.: 12/951,672

(22) Filed: Nov. 22, 2010

(65) Prior Publication Data

US 2011/0070524 A1    Mar. 24, 2011

Related U.S. Application Data

(62) Division of application No. 11/113,503, filed on Apr. 25, 2005, now abandoned.

(51) Int. Cl.
*H01M 8/10* (2016.01)
*H01M 8/02* (2016.01)

(52) U.S. Cl.
CPC ......... *H01M 8/0245* (2013.01); *H01M 8/0239* (2013.01); *H01M 8/0234* (2013.01); *H01M 2008/1095* (2013.01); *Y02E 60/50* (2013.01); *Y10T 428/249953* (2015.04)

(58) Field of Classification Search
CPC .................. H01M 2008/1095; H01M 8/0239; H01M 8/0245
USPC .................................. 429/480, 483, 491, 493
See application file for complete search history.

(56) References Cited

U.S. PATENT DOCUMENTS

| | | | |
|---|---|---|---|
| 3,607,348 A | 9/1971 | Wray et al. | |
| 4,060,657 A | 11/1977 | Iwami et al. | |
| 4,196,065 A | 4/1980 | Gaussens et al. | |
| 4,618,533 A | 10/1986 | Steuck | |
| 4,917,793 A | 4/1990 | Pitt et al. | |
| 5,039,421 A | 8/1991 | Linder et al. | |
| 5,763,113 A | 6/1998 | Meltser et al. | |
| 6,024,848 A * | 2/2000 | Dufner et al. | 204/252 |
| 6,066,448 A | 5/2000 | Wohlstadter et al. | |
| 6,350,539 B1 | 2/2002 | Wood, III et al. | |
| 6,358,557 B1 | 3/2002 | Wang et al. | |
| 6,800,118 B2 | 10/2004 | Kusunose et al. | |
| 7,048,971 B2 | 5/2006 | Arora | |
| 7,250,189 B2 | 7/2007 | Ji et al. | |
| 2001/0010252 A1 | 8/2001 | Hirata et al. | |
| 2003/0044714 A1 | 3/2003 | Teraoka et al. | |
| 2003/0068544 A1 | 4/2003 | Cisar et al. | |
| 2003/0219645 A1 | 11/2003 | Reichert et al. | |
| 2003/0232234 A1 | 12/2003 | Cisar et al. | |
| 2004/0134292 A1 | 7/2004 | Roth | |
| 2004/0137311 A1 | 7/2004 | Mathias et al. | |
| 2004/0157108 A1 | 8/2004 | Blunk et al. | |
| 2004/0185242 A1 | 9/2004 | Charkoudian | |
| 2004/0202917 A1 | 10/2004 | Chapman et al. | |
| 2004/0213918 A1 | 10/2004 | Mikhael et al. | |
| 2004/0213986 A1 | 10/2004 | Kim et al. | |
| 2004/0214110 A1 | 10/2004 | Kim et al. | |
| 2004/0242714 A1 * | 12/2004 | Penezina et al. | 521/50 |
| 2007/0178280 A1 | 8/2007 | Bower et al. | |
| 2011/0027492 A1 * | 2/2011 | Mekala et al. | 427/490 |

FOREIGN PATENT DOCUMENTS

| | | |
|---|---|---|
| CN | 1608331 A | 4/2005 |
| JP | S6212267 | 1/1987 |
| JP | 10-50328 | 2/1998 |
| JP | 2003-323898 | 11/2003 |
| JP | 2004311315 | 11/2004 |
| JP | 2007506250 | 3/2007 |
| WO | 03058743 A2 | 7/2003 |
| WO | 2004/022201 A1 | 3/2004 |
| WO | 2004/066427 A1 | 8/2004 |
| WO | 2005/014184 A1 | 2/2005 |
| WO | 2005/034271 | 4/2005 |

OTHER PUBLICATIONS

Office Action dated Jul. 25, 2001 in corresponding JP 2008-508869, filed Mar. 31, 2006, 5pgs.

* cited by examiner

*Primary Examiner* — Ladan Mohaddes
(74) *Attorney, Agent, or Firm* — Brooks Kushman P.C.

(57) ABSTRACT

In at least certain embodiments, the present invention provides a diffusion media and fuel cells and systems employing the diffusion media. In at least one embodiment, the diffusion media comprises a porous matrix having an outer surface and a hydrophilic polymeric coating on at least a portion of the porous matrix with the hydrophilic coating comprising the cured product of a formulation comprising a hydrophilic monomer.

14 Claims, 2 Drawing Sheets

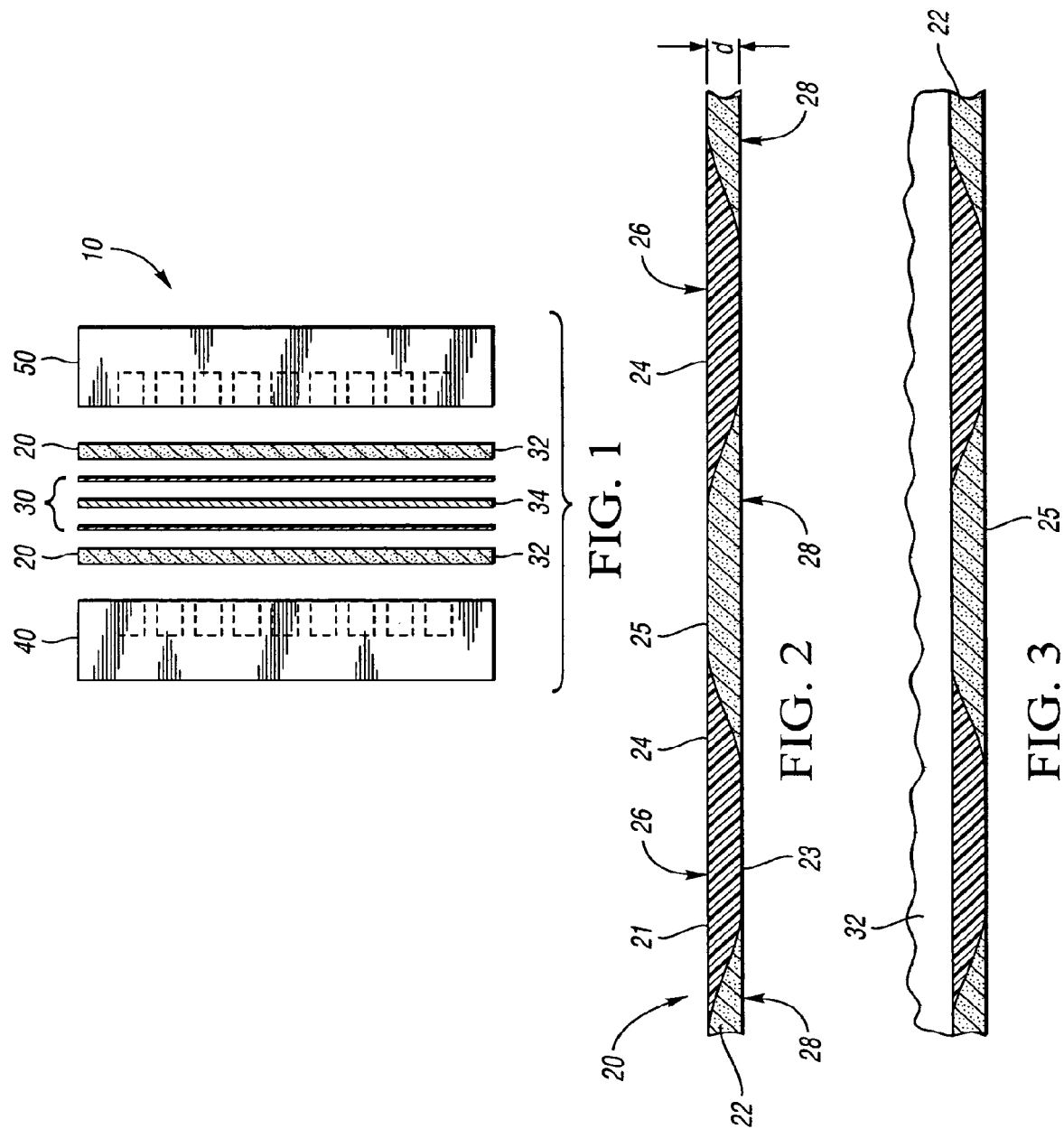

DIFFUSION MEDIA, FUEL CELLS, AND FUEL CELL POWERED SYSTEMS

CROSS-REFERENCE TO RELATED APPLICATIONS

This application is a division of U.S. application Ser. No. 11/113,503, filed Apr. 25, 2005, the disclosure of which is incorporated in its entirety by reference herein.

FIELD OF THE INVENTION

The present invention relates generally to diffusion media, fuel cells employing diffusion media according to the present invention, and fuel cell powered systems utilizing such fuel cells. More specifically, the present invention is related to the use of diffusion media in addressing water transport difficulties in fuel cells and other types of devices.

BACKGROUND ART

Fuel cells have been used as a power source in many applications and have been proposed for use in electrical vehicular power plants to replace internal combustion engines. In proton exchange membrane (PEM) type fuel cells, hydrogen is supplied to the anode of the fuel cell and oxygen is supplied as the oxidant to the cathode. PEM fuel cells include a membrane electrode assembly (MEA) comprising a thin, proton conductive, non-electrically conductive solid polymer electrolyte membrane having the anode on one of its faces and the cathode on the opposite face. The MEA is sandwiched between a pair of electrically conductive elements which (1) serve as current collectors for the anode and cathode, and (2) contain appropriate channels and/or openings therein for distributing the fuel cell's gaseous reactants over the surfaces of the respective anode and cathode catalysts. A plurality of individual cells are commonly bundled together to form a PEM fuel cell stack. The term fuel cell is typically used to refer to either a single cell or a plurality of cells (stack) depending on the context. A group of cells within the stack is typically referred to as a cluster. Typical arrangements of multiple cells in a stack are described in U.S. Pat. No. 5,763,113, assigned to General Motors Corporation.

In PEM fuel cells hydrogen ($H_2$) is the anode reactant (i.e., fuel) and oxygen is the cathode reactant (i.e., oxidant). The oxygen can be either a pure form ($O_2$), or air (a mixture of $O_2$ and $N_2$). The solid polymer electrolytes are typically made from ion exchange resins such as perfluorinated sulfonic acid ionomers. The anode/cathode typically comprises finely divided catalytic particles, which are often supported on carbon particles, and admixed with a proton conductive resin. The catalytic particles are typically costly precious metal particles. These membrane electrode assemblies, which comprise the catalyzed electrodes, require certain controlled conditions in order to maintain certain hydration for optimized proton conductivity and avoid flooding.

Efficient operation of a fuel cell depends, at least in part, on the ability to effectively disperse reactant gases at catalytic sites of the electrode where reaction occurs. In addition, effective removal of product water is desired so as to not inhibit flow of fresh reactants to the catalytic sites. Therefore, it is desirable to improve the mobility of reactant and product water to and from the MEA where reaction occurs.

To improve the mobility of reactant and product species to and from the MEA where reactions occur, a diffusion structure which enhances mass transport to and from an electrode in a MEA of a fuel cell is used. The diffusion structure cooperates and interacts with an electrode at a major surface of the electrode opposite the membrane electrolyte of the cell, therefore, electrical and heat conductivity are required. The diffusion structure facilitates the supply of reactant gas to the electrode. The diffusion structure is hereinafter referred to as a diffusion media. See for example U.S. Pat. No. 6,350,539 issued to the assignee of the present application. The diffusion media is positioned between the MEA and the cathode or anode flow channels of an individual fuel cell. One example of a relatively typical diffusion media comprises an electrically conductive porous media such as carbon paper.

In an operating PEM fuel cell, water is generated at the cathode side due to the electrochemical reaction between hydrogen and oxygen occurring within the MEA. Water is also typically introduced through reactant gas streams into fuel cells to humidify the membrane to ensure good proton conductivity. PEM fuel cells can experience a relative excess of water, which, if not removed from the system, could block the transportation path between oxidant gas and cathode electrode. In addition to possible oxidant starvation on the cathode side, water slugs in the gas flow channel may also be formed on the anode side which can cause hydrogen starvation. Water on the anode side can result from external humidification of the hydrogen gas and from back diffusion through the membrane (cathode to anode). If these occur, the fuel cell efficiency can decrease and may eventually lead to system shutdown, a phenomenon called "flooding." Managing water is therefore a relatively important aspect for the efficient operation of a fuel cell.

The diffusion media plays a relatively important role in PEM fuel cells water management. The diffusion media can facilitate movement of water to ensure good transportation paths between reactant gases and catalyst electrodes in the MEA. One conventional practice to accomplish this is to coat the diffusion media (such as carbon paper) with a hydrophobic material such as polytetrafluoroethylene (PTEE). This PTEE coating makes the media more hydrophobic and thus helps to prevent water from blocking the flow channels in diffusion media. Even still, other water management properties are sought to provide more efficient water management. It would be desirable for the gas diffusion media to provide a flow path for increased water management in a fuel cell.

SUMMARY OF THE INVENTION

In at least one embodiment, the present invention comprises a porous matrix having an outer surface comprising a first major face and a second major face and a hydrophilic polymeric coating on at least a portion of the porous matrix wherein the hydrophilic coating comprises the cured product of a formulation comprising a hydrophilic monomer.

In at least another embodiment, the present invention comprises a fuel cell comprising an anode, a cathode, a PEM disposed between the anode and the cathode, and a diffusion media disposed between at least one of the anode and the cathode and the PEM. The diffusion media comprises a porous matrix having an outer surface comprising a first major face and a second major face and a hydrophilic polymeric coating on at least a portion of the outer surface. The hydrophilic coating comprises the cured product of a formulation comprising a hydrophilic monomer.

In at least yet another embodiment, the present invention comprises a method for making a diffusion media. The method comprises providing a porous matrix and coating at least a portion of the porous matrix with a hydrophilic polymeric coating. In at least one embodiment, the coating step comprises exposing the porous matrix to a hydrophilic formulation comprising a hydrophilic monomer to form a coating precursor on the porous matrix, masking a first portion of the precursor coated porous matrix while leaving a second portion of the matrix unmasked, and exposing the precursor coated porous matrix to UV light to UV cure the coating precursor on the second portion of the matrix to form the hydrophilic polymeric coating on the second portion.

Further areas of applicability of the present invention will become apparent from the detailed description provided herein. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings where like structure is indicated with like reference numerals and in which:

FIG. 1 is an exploded schematic illustration of a fuel cell incorporating a porous diffusion media according to the present invention;

FIG. 2 is an illustration of a diffusion media according to embodiments of the present invention;

FIG. 3 is an illustration of a diffusion media according to embodiments of the present invention positioned against a catalyst layer;

DETAILED DESCRIPTION OF THE PREFERRED EMBODIMENT(S)

Figure 4:
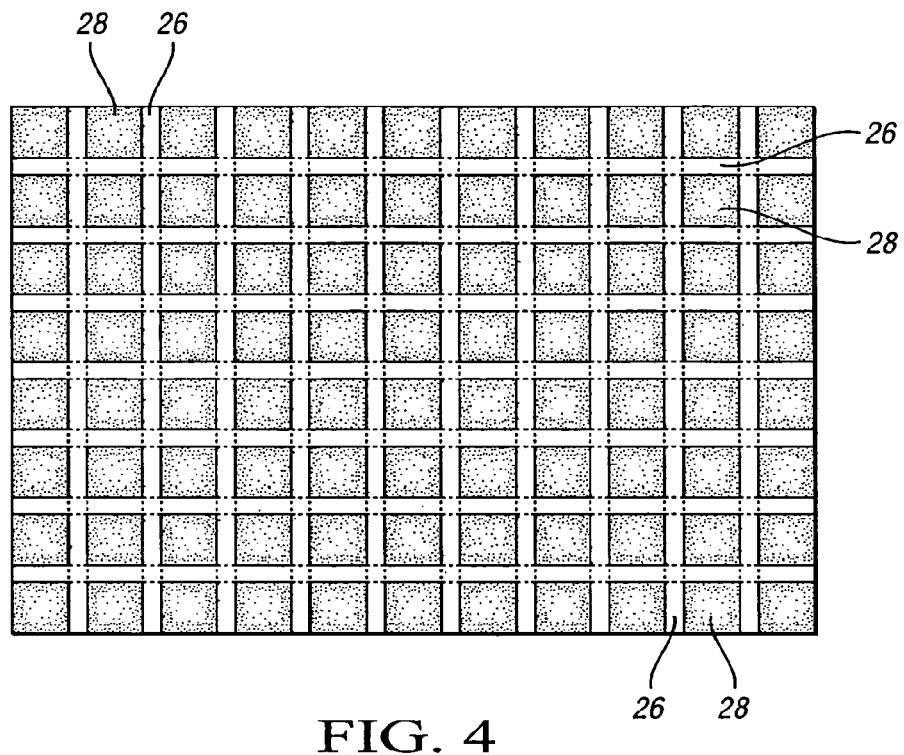
FIG. 4 is a schematic representation of a diffusion media according to other embodiments of the present invention.

The following description of the preferred embodiments is merely exemplary in nature and is in no way intended to limit the invention, its application, or uses. Reference will now be made in detail to presently preferred compositions, embodiments and methods of the present invention, which constitute the best modes of practicing the invention presently known to the inventors. The figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative bases for the claims and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of", and ratio values are by weight; the term "polymer" includes "oligomer", "copolymer", "terpolymer", and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and to normal grammatical variations of the initially defined abbreviation; and, unless expressly stated to the contrary, measurement of a property is determined by the same technique as previously or later referenced for the same property.

Referring initially to FIG. 1, an exemplary fuel cell 10 incorporating porous diffusion media 20 according to the present invention is illustrated. Specifically, the fuel cell 10 comprises a membrane electrode assembly 30 interposed between an anode flow field 40 and a cathode flow field 50 of the fuel cell 10. It is contemplated that the flow fields 40, 50 and the membrane electrode assembly 30 may take a variety of conventional or yet to be developed forms without departing from the scope of the present invention. Although the particular form of the membrane electrode assembly 30 is beyond the scope of the present invention, in the illustrated embodiment, the membrane electrode assembly 30 includes respective catalytic electrode layers 32 and an ion exchange membrane 34.

Referring to FIG. 2, a porous diffusion media 20 according to one embodiment of the present invention is illustrated. The diffusion media 20 comprises a porous matrix 22 having a hydrophilic polymeric coating 24 on at least a portion of the surface of the porous matrix. In at least one embodiment, the hydrophilic polymeric coating 24 comprises a cured polymer suitable to result in a contact angle for the coated media 20 of less than 90°, in other embodiments of less than 75°, in yet other embodiments of less than 50°, in still yet other embodiments of less than 25°, in still yet other embodiments of less than 15°, in still yet other embodiments of less than 10°, in still yet other embodiments of less than 5°, and in still yet other embodiments of 0°. The hydrophilic coating 24 can provide an efficient water flow path through the media 20 to wick water away. A contact angle of 0° for a porous media means that water will essentially immediately travel or wick through the diffusion media 20.

In at least one embodiment, the coating 24 is a hydrophilic, polymerized, cross-linked monomer that renders the coated matrix 22 hydrophilic, (i.e., having a contact angle less than 90°). The monomer can be deposited on the surfaces of the porous matrix 22 by graft polymerization and/or by deposition of the cross-linked monomer. In at least one embodiment, the coating 24 can be between 1 nm (nanometer) and 1 µm (micron) thick, in another embodiment between 5 and 100 nm thick, and in still yet another embodiment between 10 and 50 nm thick. At thicknesses below 1 nm, the matrix 22 may not be sufficiently hydrophilic. At thicknesses above 1 micron, the permeability of the matrix 22 can be impaired.

The porous matrix 22 may comprise any suitable porous matrix material, such as an electrically conductive material, carbon paper, graphite paper, cloth, felt, foam, carbon or graphite wovens, carbon or graphite non-wovens, metallic screens or foams, and combinations thereof. Although the dimensions of the matrix 22 will depend largely upon the design requirements associated with the particular application in which the porous diffusion media 20 is to be utilized it is noted that thicknesses d of between 20 µm and 1000 µm or, more particularly, 200 µm, are likely to find utility.

Similarly, by way of illustration and not limitation, the porous matrix may define a porosity characterized by a permeometer number (as measured with a Gurley Permeometer, model no. 4301) of 50 ft$^3$/min./ft$^2$ at 0.5 inches of water or, more generally, a Gurley permeometer number of between 20 ft.$^3$/min./ft.$^2$ and 100 ft.$^3$/min./ft.$^2$ at 0.5 inches of water. In this context, it is noted that porosity is the measure of how easily air can pass through a sample of material. The Gurley test measures the time needed to pass a given volume of air through the sample.

The polymerization and cross-linking of the polymerizable monomer to the porous matrix 22 by grafting and/or deposition may be effected so that substantially the entire surface of the porous matrix including the inner surfaces of the pores (i.e., across the porous matrix thickness d or bulk) is coated entirely with a cross-linked/grafted polymer. Alternatively, the coating 24 may be limited to less than the entire surface of the matrix 22, such as a portion of the entire surface or bulk (less than d, such as one-half of d), one or both sides of the matrix 22, portions of one or both sides of the matrix 22, and/or strips or other discrete shapes of coverage.

In one process embodiment, a reagent bath comprising a free radical polymerizable monomer, a polymerization initiator and cross-linking agent in a solvent or other suitable diluent for the reactant constituents is contacted with the porous matrix 22. The treated matrix 22 is then placed under conditions to effect free radical polymerization of the monomer and coating of the porous matrix with the cross-linked polymer. When the monomer is difunctional or has higher functionality, an additional cross-linking agent need not be utilized.

Any monomer for coating the polymer can be utilized herein so long as it is hydrophilic, capable of being polymerized by free radical polymerization, and can be cross-linked. Suitable hydrophilic monomers include, but are not limited to, hydroxyl substituted ester acrylate and ester methacrylate, including but not limited to 2-hydroxyethylacrylate, 2- and 3-hydroxypropylacrylate, 2,3-dihydroxypropylacrylate, polyethoxyethyl-, and polyethoxypropylacrylates; acrylamide, methacrylamide and its derivatives, including but not limited to N-methylacrylamide, N,N-dimethylacrylamide, N,N-dimethylmethacrylamide, N,N-dimethyl-aminoethyl, N,N-diethyl-aminoethyl, 2-acrylamido-2-methyl-1-propanesulfonic acid, N-[3-dimethylamino)propyl]acrylamide, and 2-(N,N-diethylamino)ethyl methacrylamide; polyethylene glycol acrylates, polyethylene glycol methacrylates, polyethylene glycol diacrylates, polyethylene glycol dimethacrylates; polypropylene glycol acrylates, polypropylene glycol methacrylates, polypropylene glycol diacrylates, polypropylene glycol dimethacrylates; acrylic acid; methacrylic acid; 2- and 4-vinylpyridine; 4- and 2-methyl-5-vinylpyridine; N-methyl-4-vinylpiperidine; 2-methyl-1-vinylimidazole; dimethylaminoethyl vinyl ether; N-vinylpyrrolidone; itaconic, crotonic, fumaric and maleic acids; styrene sulfonic acid and mixtures thereof. In at least one embodiment, a particularly suitable monomer comprises polyethylene glycol acrylate.

Suitable cross-linking agents for the monomers set forth above are well known in the art. Suitable agents include, but are not limited to, monomers having di- or multi-unsaturated functional groups, including but not limited to diacrylates and dimethacrylates of -polyethylene glycol and -polypropylene glycol, trimethylolpropane triacrylate and trimethacrylate, di-trimethylolpropane tetraacrylate, pentaerythritol tetraacrylate, tetramethacrylate, divinylbenzene, divinyl sulfone silicone-containing diacrylates and dimethacrylates. In at least one embodiment, a particularly suitable cross-linking agent comprises polyethylene glycol diacrylate.

Suitable initiators for the monomers set forth above are well known in the art. Suitable initiators include, but are not limited to, ammonium persulfate, potassium persulfate, 4,4'-azobis(4-cyanovaleric acid), 2,2'-azobis(2-amidinopropane) hydrochloride, potassium hydrogen persulfate, ketones or the like. In at least one embodiment, a particularly suitable cross-linking agent comprises ketone, such as Ciba Specialty Chemicals IRGACURE 184 (1-hydroxy-cycle-phenyl-ketone).

The particular solvent composition or diluent, employed for the polymerizable monomer, polymerization initiator and cross-linking agent will depend upon the particular reactants employed. All that is necessary is that the reactants dissolve in the solvent and that the solvent does not attack the porous matrix 22. Representative suitable solvent compositions include (a) water and (b) a water-miscible organic solvent such as N-methylpyrrolidone, dimethyl sulfoxide, isopropanol, 2-propanol, tetrahydrofuran, propylene carbonate, gammabutyrolactone, tetrahydrothiophene-1,1-dioxide, N-cyclohexyl-2-pyrrolidone, tetramethylurea or the like.

Generally, the polymerizable monomer can generally be present in the reactant solution in at least one embodiment at a concentration of between 1% and 100% by weight, in another embodiment between 5% and 50% by weight, and in yet another embodiment between 10% and 30% by weight, based upon the weight of the reactant solution. In at least one embodiment, the cross-linking agent can generally be present in an amount of between 0.5% and 100% by weight, in another embodiment between 1% and 25% by weight, and in yet another embodiment between 2% and 10% by weight, based upon the weight of the reactant solution. In at least one embodiment, the polymerization initiator can generally be present in an amount of between 0.01% and 10% by weight, in another embodiment between 0.5% and 5% by weight, and in yet another embodiment between 1% and 3% by weight, based upon the weight of the reactant solution. As noted above, the cross-linking agent can be utilized without the monomer and, thereby could function as the polymerizable monomer.

Any conventional energy source for initiating free radical polymerization can be employed such as ultraviolet light, heating, gamma radiation, electron beam radiation or the like. In at least one embodiment, the polymerization reaction should be effected for a time to assure that the desired surface of the porous matrix 22 is coated with the deposited polymer composition but without substantially plugging the pores in the matrix 22. In at least one embodiment, the hydrophilic polymeric coating 24 reduces the gas permeability of the porous matrix 22, relative to its initial gas permeability, by less than 40%, in other embodiments by less than 25%, and in yet other embodiments by less than 15%. Generally, in at least one embodiment, suitable reaction times are between 0.1 and 30 minutes, and in other embodiments, between 1 and 4 minutes. Reaction could be effected while the porous matrix 22 is immersed in solution. However, this could likely result in the polymerization of the monomer throughout the solution. It is preferred to saturate the porous matrix 22 with the reactant solution and to effect reaction outside of the solution so that monomer is not wasted. Thus, the reaction can be conducted batchwise or continuously. When operating as a continuous process, a sheet of porous matrix 22 is saturated with the reactant solution and then transferred to a reaction zone where it is exposed to energy to effect the polymerization reaction.

As set forth above, in at least one embodiment, the hydrophilic polymeric coating 24 may be disposed on the entire surface of the porous matrix 22. In at least another embodiment, the hydrophilic polymeric coating 24 may be disposed on less than the entire surface of the porous matrix 22. For instance, in at least certain embodiments, the hydrophilic polymeric coating 24 may be disposed on one or both of the major face 21 or 23 of the matrix 22, or on a portion of one or both of the major faces 21, 23 of the matrix. Furthermore, in at least another embodiment, the hydrophilic polymeric coating 24 may be disposed on substantially all or portions of one or both major faces 21, 23 of the matrix 22 and extend substantially into the bulk of the matrix 22 between the coated portions of the major faces 21, 23.

Referring collectively to FIGS. 2 and 4, certain embodiments are illustrated where exemplary spaced regions 26 of the hydrophilic coating 24 can be distributed across a cross section of the porous diffusion media 20 between the first and second major faces 21, 23 of the diffusion media and may alternate across the first and second major faces 21, 23. In this embodiment, substantially uncoated regions 28 of the porous matrix 22 may be between the hydrophilic coated regions. For illustrative purposes, and not by way of limitation, it is noted that according to one embodiment of the present invention the spaced hydrophilic coating regions 26 can be characterized by a periodicity of less than 5.0 cm, according to another embodiment of less than 1.0 cm, according to yet another embodiment of 0.5 cm, and according to still yet another embodiment of 0.25 cm. Of course, the periodicity, shapes, and relative sizes of the hydrophilic regions 26 depend largely upon the design requirements associated with the particular, application in which the porous diffusion media 20 is to be utilized.

The spaced configuration of the hydrophilic coating regions 26 of the present invention, as exemplarily illustrated in FIGS. 2-4, can limit the interference between water and gas transfer by providing for division of the diffusion media 20 into regions 26 where water transfer is emphasized and regions 28 where gas transfer is emphasized.

In certain embodiments of the present invention, the hydrophilic regions 26 may be defined as being sufficiently hydrophilic to define contact angle of less than 90°, in other embodiments of less than 75°, in yet other embodiments of less than 50°, in still yet other embodiments of less than 25°, in still yet other embodiments of less than 15°, in still yet other embodiments of less than 10°, in still yet other embodiments of less than 5°, and in still yet other embodiments of 0°.

As is also illustrated in FIGS. 2-4, in at least certain embodiments, the porous diffusion media 20 may comprise hydrophobic material 25, such as in the form of a hydrophobic layer, disposed along at least a portion of one of, such as the second major face 23, the diffusion media 20. The hydrophobic material 25 typically forms a relatively thin hydrophobic coating layer on the surfaces of the porous matrix 22, e.g., up to 1 μm in thickness, without significantly reducing gas permeability of the porous matrix 22. In the illustrated embodiment, the hydrophobic material 25 can help to prevent accumulation of liquid water droplets on the diffusion media 20. It is contemplated that it may be preferable to ensure that the hydrophobic material 25 be more repellent to water droplets, i.e., more hydrophobic, than both the coated and uncoated regions 26, 28 of the porous diffusion media 20.

The hydrophobic material 25 is normally comprised of a fluoropolymer. By way of illustration and not limitation, suitable fluoropolymers may be produced from tetrafluoroethylene (TFE), hexafluoropropylene (HFP), ethylene and tetrafluoroethylene (ETFE), fluorinated ethylene and propylene (FEP), a perfluoromethyl vinyl ether, vinylidene fluoride, and the like, and combinations thereof.

In at least one embodiment, the hydrophilic polymeric coating 24 and the hydrophobic material 25 may be disposed in discrete patterns about the porous matrix 22 to create regions in the diffusion media 20 where water transfer is emphasized and where gas transfer is emphasized. In this type of configuration, water transfer would be emphasized at the portions 26 of the matrix 22 coated with the hydrophilic coatings 24 and the gas transfer would be emphasized at the areas 28 coated with the hydrophobic material 25.

In at least one embodiment, the diffusion media 20 of the present invention is made by exposing the porous matrix 22 to a solution of solvent (if necessary), hydrophilic monomer, crosslinker (if necessary) and preferably an initiator. In at least one embodiment, the porous matrix 22 is exposed to the solution by dipping the porous matrix 22 in the solution. The treated porous matrix 22 can then be allowed to dry to let any solvent evaporate to leave the treated porous matrix 22 with a coating precursor thereon. The porous matrix 22 with the coating precursor thereon can then be exposed to a curing medium, such as UV light, to cure coating 24 onto the porous matrix 22 to form the diffusion media 20.

In an alternative embodiment, selective placement of the hydrophilic coating 24 can be accomplished by covering the porous matrix 22 with the coating precursor thereon with a suitable mask, such as a metal or plastic plate, and then exposing the mask porous matrix 22 to a suitable curing medium to cure the uncovered (i.e., unmasked) portions of the porous matrix 22. In this embodiment, a particularly suitable curing medium is UV light since the UV light will not cure the coating precursor covered by the mask. After removing the mask, the porous matrix 22 with the predetermined coating layers 24 can then be exposed to a rinsing with solvent to remove the uncured coating precursor from the porous matrix 22. The porous matrix 22 with the portions that are coated with a hydrophilic coating 24 can then be allowed to dry to form the diffusion media. Also, it is contemplated that an alternative to using a mask can be to selectively apply the hydrophilic monomer solution only to discrete areas 26 to be coated with the hydrophilic coating 24. If desired, the hydrophobic material 25 can be disposed on or secured to the diffusion media 20 in any suitable manner, either before or after being coated with the hydrophilic coating 24. If hydrophobic material 25 is employed, it can be disposed on the media 20 in any suitable manner, such as by vapor phase PTFE deposition.

Figure 5:
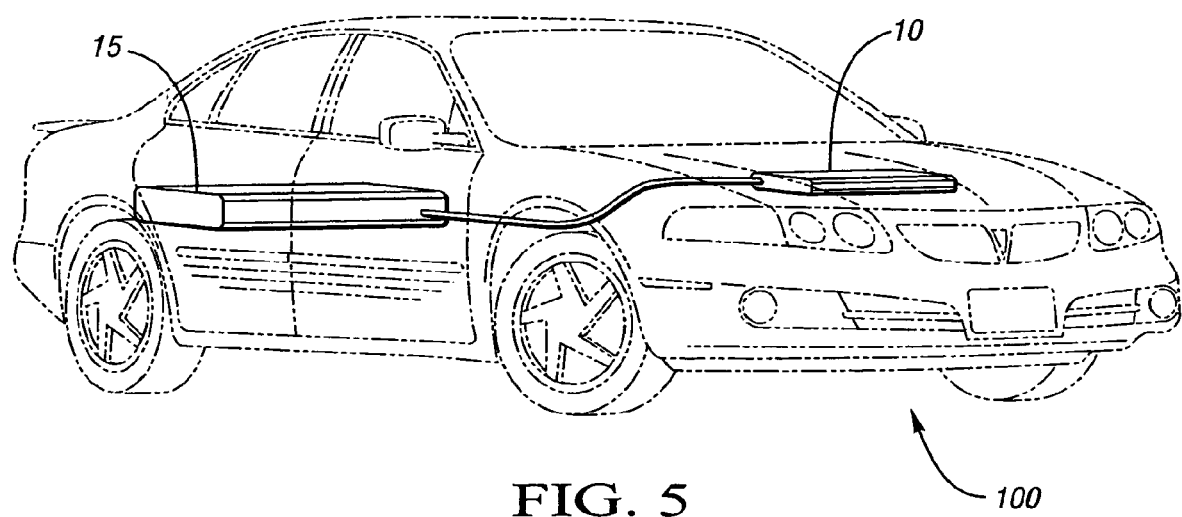
FIG. 5 is an illustration of a vehicle incorporating a fuel cell employing a porous diffusion media according to the present invention.

Referring to FIG. 5, it is noted that devices according to the present invention may include additional structure defining a fuel cell powered motor vehicle 100, in combination with a fuel cell 10 according to the present invention and a fuel storage mechanism 15. It is to be appreciated, however, that other fuel cell system applications, such as for example, in the area of residential systems, may benefit from the present invention.

The present invention will be further explained by way of example. It is to be appreciated that the present invention is not limited by the example.

Example

A formulation of hydrophilic coating composition is prepared comprising 0.1 grams of polyethylene glycol diacrylate (PEGDA), 0.4 grams of polyethylene glycol acrylate (PEGA), 0.02 grams of the photoinitiator Irgacure 184

(available from Ciba Specialty Chemicals) and 1.5 milliliters of isopropanol. A carbon fiber diffusion media is then immersed in the solution for one minute. The diffusion media is then removed from the solution and exposed to air for five minutes to evaporate the isopropanol solvent. The treated diffusion media is then exposed to UV curing.

In order to test durability of the hydrophilic coating, the diffusion media with the hydrophilic coating is exposed to water heated to 95° C. for three days and then thereafter exposed to an acidic solution of water (pH=2) at 95° C. for three days. After exposure to water and the acidic solution of water, the diffusion media remains hydrophilic indicating that the hydrophilic coating is very stable and suitably adhered to the porous matrix of the diffusion media.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and, scope of the invention. Furthermore, although some aspects of the present invention are identified herein as preferred or particularly advantageous, it is contemplated that the present invention is not necessarily limited to these preferred aspects of the invention.

What is claimed:

1. A fuel cell comprising:
   an anode flow field;
   a cathode flow field;
   a membrane electrode assembly interposed between the anode flow field and the cathode flow field;
   a first diffusion medium interposed between the anode flow field and the membrane electrode assembly; and
   a second diffusion medium interposed between the anode flow field and the membrane electrode assembly, the first and second diffusion medium each independently including:
   a porous matrix having an outer surface comprising a first major face and a second major face;
   a hydrophilic polymeric coating on at least a first portion of the outer surface, the hydrophilic polymeric coating comprising a cured product of a formulation comprising a hydrophilic monomer; and
   a hydrophobic layer on at least a second portion of the outer surface, the hydrophobic layer having a thickness up to 1 micron.

2. The fuel cell of claim 1 wherein the hydrophilic polymeric coating is sufficiently hydrophilic to define a contact angle of less than 90° along one of the first and second major faces of the first diffusion medium.

3. The fuel cell of claim 1 wherein the hydrophilic polymeric coating is sufficiently hydrophilic to define a contact angle of less than 25° along one of the first and second major faces of the first diffusion medium.

4. The fuel cell of claim 1 wherein the hydrophilic polymeric coating is sufficiently hydrophilic to define a contact angle of 0° along one of the first and second major faces of the first diffusion medium.

5. The fuel cell of claim 1 wherein the porous matrix comprises an electrically conductive material comprising at least one of: carbon paper, graphite paper, cloth, felt, foam, carbon or graphite wovens, carbon or graphite nonwovens, metallic screens or foams, and combinations thereof.

6. The fuel cell of claim 5 wherein the porous matrix defines a thickness of between 20 µm and 1000 µm and the hydrophilic polymeric coating has a thickness between 1 nm and 1 µm.

7. The fuel cell of claim 2 wherein the outer surface includes an inner surface portion extending between the first and second major faces, the hydrophilic polymeric coating being disposed on the inner surface portion and extending between the first and second major faces.

8. The fuel cell of claim 7 wherein the hydrophilic monomer comprises a glycol acrylate or glycol methacrylate.

9. The fuel cell of claim 1 wherein the hydrophilic polymeric coating comprises polyethylene glycol acrylate.

10. The fuel cell of claim 7 wherein the hydrophilic monomer is UV curable.

11. The fuel cell of claim 10 wherein the formulation comprises polyethylene glycol acrylate, polyethylene glycol diacrylate, photoinitiator, and solvent.

12. The fuel cell of claim 1 wherein the hydrophobic layer is disposed along one of the first and second major faces of the first diffusion medium.

13. The fuel cell of claim 1 wherein the hydrophilic polymeric coating has portions distributed across a cross section of the first diffusion medium between first and second major faces of the first diffusion medium.

14. The fuel cell of claim 1 wherein the hydrophilic polymeric coating comprises regions of hydrophilic polymeric coating and the first diffusion medium comprises uncoated regions, the regions of the hydrophilic polymeric coating and the uncoated regions alternate across at least one of first and second major faces of the first diffusion medium.

* * * * *